(12) United States Patent
Trost et al.

(10) Patent No.: US 9,079,571 B2
(45) Date of Patent: Jul. 14, 2015

(54) METHOD FOR OPERATING A BRAKE ASSIST DEVICE AND BRAKE ASSIST DEVICE FOR A VEHICLE

(75) Inventors: Juergen Trost, Grafenberg (DE); Zoltan Zomotor, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/822,362

(22) PCT Filed: Aug. 25, 2011

(86) PCT No.: PCT/EP2011/004267
§ 371 (c)(1),
(2), (4) Date: Apr. 9, 2013

(87) PCT Pub. No.: WO2012/052084
PCT Pub. Date: Apr. 26, 2012

(65) Prior Publication Data
US 2013/0211687 A1 Aug. 15, 2013

(30) Foreign Application Priority Data
Oct. 23, 2010 (DE) .......................... 10 2010 049 351

(51) Int. Cl.
*B60T 7/12* (2006.01)
*B60T 7/22* (2006.01)
*B60W 30/09* (2012.01)
*B60W 50/00* (2006.01)

(52) U.S. Cl.
CPC ............. *B60T 7/22* (2013.01); *B60T 2201/022* (2013.01); *B60T 2210/32* (2013.01); *B60W 30/09* (2013.01); *B60W 2050/0075* (2013.01); *B60W 2050/0078* (2013.01); *B60W 2550/141* (2013.01); *B60W 2550/402* (2013.01)

(58) Field of Classification Search
CPC .................................. G01S 13/931; G08G 1/16
See application file for complete search history.

(56) References Cited

U.S. PATENT DOCUMENTS

| 4,815,792 | A | * | 3/1989 | Troster .................... 303/113.1 |
| 6,292,753 | B1 | * | 9/2001 | Sugimoto et al. ............. 701/301 |
| 6,442,484 | B1 | * | 8/2002 | Miller et al. .................. 701/301 |
| 7,018,004 | B2 | * | 3/2006 | Chen et al. .................... 303/193 |

(Continued)

FOREIGN PATENT DOCUMENTS

DE 102 58 617 A1 4/2004
DE 10 2007 015 030 A1 10/2008

(Continued)

OTHER PUBLICATIONS

Japanese Office Action for JP 2013-534180 dated Mar. 5, 2014 (Japanese and English language translation).

(Continued)

*Primary Examiner* — Jonathan M Dager
(74) *Attorney, Agent, or Firm* — Crowell & Moring LLP

(57) ABSTRACT

A method for operating a brake assist device for a vehicle and a brake assist system for carrying out the method involve effecting an assist function, in the absence of driver action, in a plurality of escalation stages on the basis of a distance of the vehicle from an object located in front of the vehicle. A warning indication is generated as an assist function and/or a braking process of the vehicle is initiated automatically. A road on which the vehicle is being driven is classified, and the execution of the assist function is permitted or prevented on the basis of the classification.

6 Claims, 2 Drawing Sheets

(56) References Cited

U.S. PATENT DOCUMENTS

Figure 1:
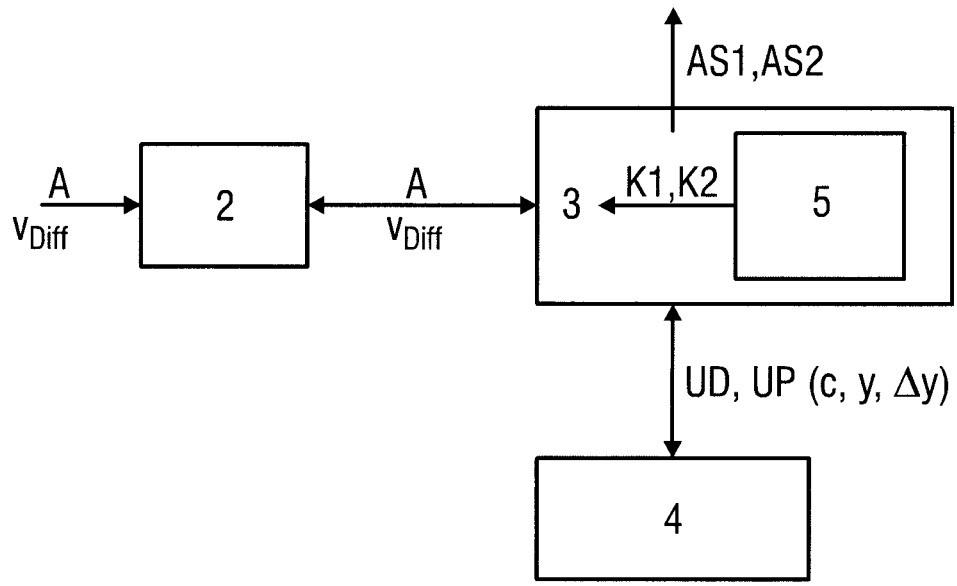

| | | | |
|---|---|---|---|
| 7,124,027 B1* | 10/2006 | Ernst et al. | 701/301 |
| 7,734,419 B2* | 6/2010 | Kondoh | 701/301 |
| 8,090,516 B2* | 1/2012 | Yonezawa et al. | 701/82 |
| 8,244,408 B2* | 8/2012 | Lee et al. | 700/301 |
| 8,380,426 B2* | 2/2013 | Konijnendijk | 701/301 |
| 8,384,534 B2* | 2/2013 | James et al. | 340/439 |
| 8,442,739 B2* | 5/2013 | Kuge et al. | 701/96 |
| 8,489,281 B2* | 7/2013 | Reichel et al. | 701/41 |
| 8,600,657 B2* | 12/2013 | Saito et al. | 701/301 |
| 8,868,325 B2* | 10/2014 | Morotomi et al. | 701/301 |
| 2002/0022927 A1* | 2/2002 | Lemelson et al. | 701/301 |
| 2003/0038715 A1* | 2/2003 | Engelman et al. | 340/439 |
| 2003/0201884 A1* | 10/2003 | Perez et al. | 340/467 |
| 2004/0019420 A1* | 1/2004 | Rao et al. | 701/45 |
| 2004/0249549 A1* | 12/2004 | Kondoh et al. | 701/96 |
| 2004/0254729 A1* | 12/2004 | Browne et al. | 701/301 |
| 2006/0001531 A1* | 1/2006 | Waterman | 340/438 |
| 2006/0031015 A1* | 2/2006 | Paradie | 701/301 |
| 2006/0220826 A1* | 10/2006 | Rast | 340/479 |
| 2007/0159311 A1* | 7/2007 | Schober | 340/435 |
| 2007/0168128 A1* | 7/2007 | Tokoro et al. | 701/301 |
| 2008/0065328 A1* | 3/2008 | Eidehall et al. | 701/301 |
| 2008/0097699 A1* | 4/2008 | Ono | 701/300 |
| 2008/0172153 A1* | 7/2008 | Ozaki et al. | 701/36 |
| 2008/0269992 A1* | 10/2008 | Kawasaki | 701/45 |
| 2008/0275618 A1* | 11/2008 | Grimm et al. | 701/96 |
| 2008/0312834 A1* | 12/2008 | Noda et al. | 701/301 |
| 2008/0319610 A1* | 12/2008 | Oechsle et al. | 701/41 |
| 2009/0030613 A1* | 1/2009 | Kataoka et al. | 701/300 |
| 2009/0037055 A1 | 2/2009 | Danner et al. | |
| 2009/0076702 A1* | 3/2009 | Arbitmann et al. | 701/96 |
| 2009/0132125 A1* | 5/2009 | Yonezawa et al. | 701/41 |
| 2009/0192710 A1* | 7/2009 | Eidehall et al. | 701/301 |
| 2009/0210114 A1* | 8/2009 | Baumann et al. | 701/45 |
| 2010/0023226 A1* | 1/2010 | Ito | 701/46 |
| 2010/0052884 A1* | 3/2010 | Zeppelin et al. | 340/435 |
| 2010/0082248 A1* | 4/2010 | Dorum et al. | 701/209 |
| 2010/0114490 A1* | 5/2010 | Becker | 701/301 |
| 2010/0214087 A1* | 8/2010 | Nakagoshi et al. | 340/436 |
| 2010/0253493 A1* | 10/2010 | Szczerba et al. | 340/435 |
| 2010/0262348 A1* | 10/2010 | Nallapa et al. | 701/70 |
| 2010/0332266 A1* | 12/2010 | Tamir et al. | 705/4 |
| 2011/0082623 A1* | 4/2011 | Lu et al. | 701/41 |
| 2011/0190972 A1* | 8/2011 | Timmons et al. | 701/29 |

FOREIGN PATENT DOCUMENTS

| | | |
|---|---|---|
| DE | 10 2007 036 417 A1 | 2/2009 |
| JP | 4-362453 A | 12/1992 |
| JP | 5-341843 A | 12/1993 |
| JP | 2004-352153 A | 12/2004 |
| JP | 2007-99237 A | 4/2007 |
| WO | WO 2006/072342 A1 | 7/2006 |

OTHER PUBLICATIONS

International Search Report with English translation dated Nov. 23, 2011 (four (4) pages).

German-language Written Opinion (PCT/ISA/237) (five (5) pages), Mar. 11, 2014.

\* cited by examiner

METHOD FOR OPERATING A BRAKE ASSIST DEVICE AND BRAKE ASSIST DEVICE FOR A VEHICLE

BACKGROUND AND SUMMARY OF THE INVENTION

Exemplary embodiments of the present invention relate to a method for operating a brake assist device for a vehicle and to a brake assist device.

German Patent document DE 102 58 617 A1 discloses a device and a method for triggering an automatic emergency braking process of a vehicle for avoiding a collision of the vehicle with a vehicle in front or for reducing the consequences of a collision, wherein a driver alarm is triggered if at least one predetermined alarm condition is fulfilled. The fulfillment of the alarm condition indicates that, on the basis of the momentary driving situation of the vehicle with a calculated acceleration of the vehicle and/or a calculated relative acceleration between the vehicle and a moving vehicle in front taken into account and on the basis of a predetermined emergency braking deceleration, the automatic emergency braking process is triggered when a predetermined warning time period has passed. The emergency braking process is triggered to achieve a predetermined target relative speed and/or a predetermined target safety distance between the vehicle and the vehicle in front once the automatic braking process is finished. A point in time is defined, which is the latest time at which full braking must be initiated in order to avoid a collision. The warning is then triggered if an interval for action up to this point in time falls below the predetermined warning time period.

PCT International Publication WO 2006/072342 A1 discloses a collision avoidance or collision consequences minimizing device and a method for operating a collision avoidance or collision consequences minimizing device of a vehicle. An existing driving distance between the vehicle and a potential collision partner is detected and a first alarm function and/or information function is activated upon reaching a first threshold value. Upon reaching a second threshold value an automatic partial braking is triggered in combination with at least one other safety measure. A partial braking is a braking with a deceleration that is less than the deceleration achievable with a full braking.

Exemplary embodiments of the present invention provide an improved method for operating a brake assist device for a vehicle and an improved brake assist device for a vehicle.

In a method for operating a brake assist device for a vehicle, an assist function is effected on the basis of a distance of the vehicle from an object in front of the vehicle and absence of driver action, in particular absence of braking and/or steering action, in particular the absence of braking and/or steering action on the part of the driver, by which the latter could reduce the hazard of a collision with the object, wherein as an assist function a warning indication is generated and/or a braking of the vehicle is automatically initiated.

A brake assist is understood to mean an active intervention in the forward control of the vehicle, in particular a control of the brake system of the vehicle, as well as an emission of visual, haptic, and/or acoustic indications which inform the driver that an intervention on the driver's part in the forward and/or lateral control of the vehicle, i.e., driver action, is required in order to avoid a collision of the vehicle with an object or at least reduce the consequences of such a collision.

According to the invention, a classification of a road on which the vehicle is being driven is carried out and the assist function is only effected if a trigger release condition dependent on the classification is fulfilled. The performance of the assist function is thus permitted or prevented on the basis of the classification. In a particularly advantageous manner, an operation adapted to the current environment (surroundings) of the vehicle is always achievable. In particular because of the adaptation of the trigger release condition to the classification of the road, accidental triggerings of the brake assist device induced by the detection of roadside structures or roadside objects such as reflector posts, guard rails, and traffic signs are avoided or at least significantly reduced. Such roadside structures and roadside objects generally depend upon the type of road, and the adaptation of the trigger release condition to the classification of the road takes them into account for triggering the assist function.

In an embodiment of the method according to the invention, the classification of the road involves a division into at least two classes, wherein the road is assigned to a first class as a highway-like road type or to a second class as a non-highway-like road type. The differentiation between the highway-like road type and the non-highway-like road type is particularly easily carried out and enables a simultaneous adaptation of the trigger release condition to the road type such that an effective and safe controlling of the brake assist device is achievable.

In an appropriate manner, the road type is determined with the aid of a number and/or width of marker lines delimiting the lane of the vehicle and/or with the aid of a width of the lane and/or from map data of a digital road map. This determination is particularly easily and effectively carried out and the respective road type can be determined with certainty.

In an improvement of the assist function, the trigger release condition is pre-specified such that it represents less of an obstacle to the execution of the assist function on a road assigned to the first class (i.e., a road classified as a highway-like road) than on a road assigned to the second class. The warning rate and/or the brake intervention rate is thus reduced on, for instance, rural roads and in developed areas (in other words, on non-highway-like roads) and unnecessary interventions of the brake assist device are avoided. On the other hand the full performance capacity of the brake assist device is ensured on highway-like roads such as two-lane expressways and motorways.

According to a particularly advantageous embodiment of the method according to the invention, the surroundings of the vehicle are monitored and a curvature of the road and/or a transverse offset of the object in front of the vehicle and/or a change in the transverse offset are detected as environment parameters and, for verifying the trigger release condition, in each case compared with a threshold predetermined on the basis of the classification of the road. Transverse offset of the object is understood to mean a lateral distance of the object from a longitudinal axis of the vehicle. The change in transverse offset refers to a change in the lateral distance that has taken place since the object was initially detected. The selection of the trigger release condition on the basis of the environment parameters leads to a further improvement in the functionality of the brake assist device, since the actions that are performed are adapted to the ambient situation of the vehicle. For example, a full braking on a curve with a sharp bend is thus avoided in order to prevent under- or oversteering or swerving of the vehicle.

Particular preference is given to additional selection of the respective escalation stage of the assist function on the basis of the classification of the road on which the vehicle is being driven. This selection of the escalation stage on the basis of the classification results in a control of the assist function adapted to the respective surroundings of the vehicle such that a hazard resulting from an automatic braking process posed to other traffic participants behind the vehicle is minimized, and thus even greater traffic safety is ensured.

In order to provide an assist function adapted to the current situation at all times, a visual and/or an acoustic alarm is/are emitted as a warning indication in a first escalation stage, an automatic partial braking is carried out as a haptic alarm in a second escalation stage, and a full braking is carried out as a braking process in a third escalation stage.

The first and second escalation stages of the assist function are preferably only performed if the object in front of the vehicle to which the assist function is supposed to react is stationary or moving in the same direction as the vehicle, i.e., is traveling in front of the vehicle. The third escalation stage is preferably only performed if the object is traveling in the same direction as the vehicle. Depending on the situation, the driver of the vehicle is thus able to avoid a collision with the object, in particular another moving vehicle ahead of the vehicle, by effecting a braking and/or an evasive maneuver. In the absence of driver action (i.e., should the driver not intervene), the collision with the object can be avoided, or at least the severity of the collision and the resulting consequences reduced, by the partial braking and/or full braking. Preferably, a full or emergency braking is not performed with stationary objects, in order to avoid triggering full braking for objects that cannot be clearly identified, in other words objects for which it cannot be determined with certainty whether they are in the road or next to the road. So-called unnecessary full braking is thus avoided when, for example, the vehicle is going around a curve and objects on the side of the road with no true speed of their own such as trees, plants, and roadside structures are detected.

Further, only those objects in front of the vehicle that are in the same lane as the vehicle are accounted for. The course of the lane and the position of the object in relation to the lane can be determined with the aid of, for example, a video-based lane detection system.

It is thus possible to prevent accidental triggerings of the brake assist device due to objects, in particular other vehicles that are not traveling in the same lane as the vehicle. In particular, accidental triggerings due to objects in the oncoming traffic flow relative to the vehicle are avoided.

A brake assist device for a vehicle includes a monitoring unit for detecting the distance of the vehicle from an object in front of the vehicle, another monitoring unit for detecting the action of the driver of the vehicle, and a control unit for effecting an assist function on the basis of the detected distance and the detected driver action, wherein the assist function includes at least the generation of a warning indication and/or the initiation of an automatic braking process of the vehicle.

According to the invention, an environment monitoring device captures environment data related to a road on which the vehicle is being driven, wherein the control unit comprises a processing unit coupled with the environment monitoring device, by means of which unit the road on which the vehicle is being driven can be classified with reference to the captured environment data. The control unit is configured to execute the assist function on the basis of the classification of the road on which the vehicle is being driven. A distinguishing characteristic of the device is its simple construction. The brake assist device of the invention is particularly easily implemented, especially in vehicles that are already equipped with an environment monitoring device and a brake assist device.

A monitoring device of a lane keeping assist device is particularly well-suited as an environment monitoring device.

BRIEF DESCRIPTION OF THE DRAWING FIGURES

Figure 2:
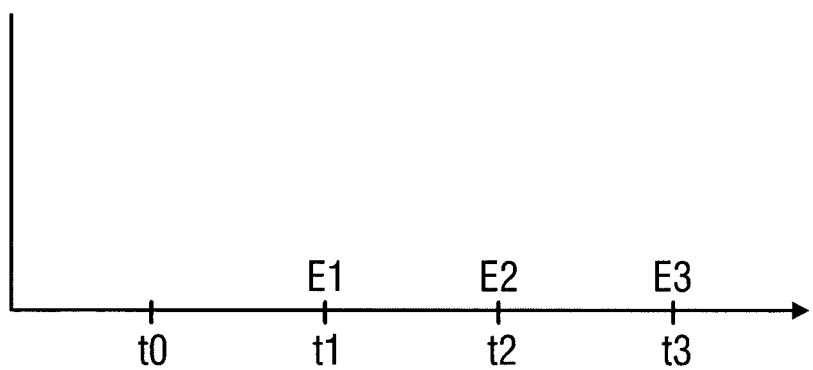
Figure 3:
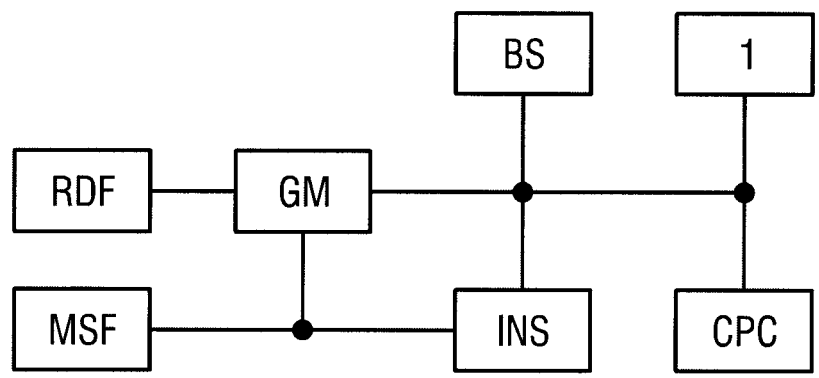
Figure 4:
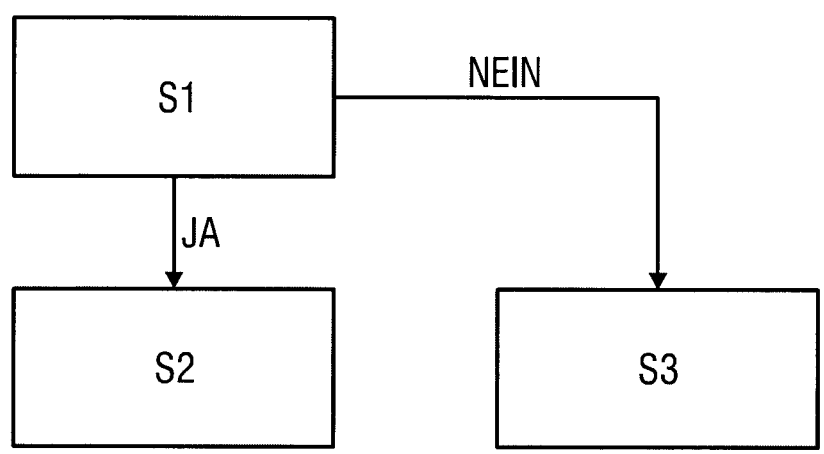

Exemplary embodiments of the invention are explained in more detail in the following, with reference to drawings. Shown are:

FIG. 1 a schematically illustrated brake assist device according to the invention, FIG. 2 schematically illustrated escalation stages of an assist function of the brake assist device according to FIG. 1, FIG. 3 a schematically illustrated exemplary embodiment of an operational sequence of a method according to the invention for operating the brake assist device according to FIG. 1, and FIG. 4 a schematically illustrated exemplary embodiment of an operational sequence of a method according to the invention for operating a brake assist device according to FIG. 1.

Corresponding parts have the same reference signs in all of the Figures.

DETAILED DESCRIPTION

A brake assist device 1 for a vehicle according to the invention is illustrated in FIG. 1. The brake assist device 1 includes a detection unit 2 for detecting a distance A of the vehicle from an object in front of the vehicle. The detection unit 2 includes at least one radar sensor RDF shown in greater detail in FIG. 3, with which a redundant measurement of the distance A is carried out with the aid of a radar signal runtime and a differential speed $V_{Diff}$ or relative speed between the moving object or the stationary object in front and the vehicle with reference to a frequency shift.

The brake assist device 1 further includes a control unit 3 for effecting an assist function of the brake assist device 1 in absence of driver action and on the basis of the distance A between the vehicle and the object in front of the vehicle. Absence of driver action is understood to mean an absence of an action on the driver's part intended to avoid a collision or reduce the consequences of a collision. Absence of driver action is in particular understood to mean a situation in which the driver does not do anything, in particular any actuation of the steering and/or the brakes, in an effort to avoid the impending collision or at least reduce the consequences of the collision.

Further, an environment monitoring device 4 is provided for monitoring the surroundings of the vehicle, which device is coupled with the control unit 3. The environment monitoring device 4 is a scanner, in particular a camera, by means of which the surroundings of the vehicle are monitored. Objects, roads, roadside structures, lane marker lines, road boundaries such as reflector posts and guard rails, and traffic signs are detected and corresponding environment data UD and environment parameters UP are generated from the captured images and transmitted to the control unit 3. As environment parameters, one or more of the following variables is/are determined:

a curvature c of the road on which the vehicle is being driven,
a transverse offset y of the object in front of the vehicle
a change Δy in the transverse offset y of the object.

Transverse offset y—henceforth also known as object transverse offset—is understood to mean the lateral distance of the object from the longitudinal axis of the vehicle and change Δy of the object transverse offset y is understood to mean the deviation of the current object transverse offset y from the object transverse offset determined when the object was initially detected.

The control unit 3 further includes a processing unit 5 by means of which a classification of a road on which the vehicle is being driven can be carried out with the aid of the environment data UD.

Alternatively, the environment monitoring device 4 and/or the processing unit 5 are components of a lane maintenance assist system (not illustrated) of the vehicle such that, in an advantageous manner, only minor additional expense is required for achieving the brake assist device 1 and the method for controlling the latter.

The classification of the road involves a division into at least two classes K1, K2. A first class K1 represents highway-like road types and a second class K2 represents non-highway-like road types.

The classification is achieved by determining the road type, wherein the respective road type is determined with the aid of a number and/or width of lane marker lines delimiting a lane of the vehicle, and with the aid of a width of the lane. Alternatively or additionally, map data of a digital road map of an onboard navigation device not shown in any greater detail are used for the determination.

For example, it is highly probable that the road is of a highway-like road type if the lane in which the vehicle is traveling is bordered by a right lane marker line and a left lane marker line, one of which is at least 20 cm wide, and if the lane is at least 3.60 m wide.

In the monitoring the surroundings of the vehicle, as environment parameters UP a curvature c of the road, a transverse offset y of the object in front of the vehicle, and a change Δy in the transverse offset y are detected. Transverse offset y of the object is understood to mean a lateral distance of the object from a longitudinal axis of the vehicle. The change Δy in the transverse offset y refers to a change in the lateral distance that has taken place since the object was initially detected.

The brake assist device 1 is a driver assist system by means of which a collision with a moving vehicle in front or with a stationary object is avoided or at least softened such that the accident consequences are reduced. This happens in such a way that no new hazards to road traffic are created.

To this end, the road on which the vehicle is being driven is classified by the control unit 3 and a triggering of the assist function is permitted or prevented on the basis of the classification. In doing so, a check is performed to determine whether one of the trigger release conditions AS1 or AS2 based on the classification and assigned to the respective classes K1 or K2 is fulfilled or not fulfilled. If the respective trigger release condition AS1 or AS2 is fulfilled, triggering of the assist function is permitted; otherwise the triggering of the assist function is prevented.

Thus the assist function, if the vehicle is on a road assigned to the first class K1 (i.e., a highway-like road type), is only permitted to be effected if the trigger release condition AS1 assigned to the first class K1 is fulfilled. Analogously, if the vehicle is on a road assigned to the class K2, the assist function is only permitted to be effected if the trigger release condition AS2 assigned to the second class K2 is fulfilled.

The trigger release conditions AS1 and AS2 are specified such that the trigger release condition AS1 assigned to the first class K1 is more easily fulfilled than the trigger release condition AS2 assigned to the second class K2. This means that on highway-like road types, the brake assist device 1 is set to a "more sensitive" level, in order to maintain its full performance capacity. On non-highway-like road types, which are characterized by more objects on the roadside such as plantings and roadside structures, the brake assist device 1 is set to a "less sensitive" level so that the brake assist device 1 is less frequently triggered than when operating on the highway-like road types. The frequency of the accidental triggerings expected on non-highway-like road types is likewise reduced.

Furthermore, the assist function of the brake assist device 1 is effected in a plurality of escalation stages E1 to E3, wherein the respective escalation stage E1 to E3 of the assist function is preferably selected on the basis of the classification of the road on which the vehicle is being driven.

These escalation stages E1 to E3 are illustrated in FIG. 2, on the basis of the times t1 to t3 at which they occur.

The time t3 indicates the latest point in time at which a full braking with a predetermined maximum deceleration must be initiated in order to avoid a collision with the object in front of the vehicle. Alternatively, the time t3 can also be defined as the latest point in time at which either the above-mentioned full braking or an evasive maneuver with a predetermined maximum lateral acceleration must be initiated in order to avoid a collision with the object.

The time t3 is determined on the basis of the distance A between the vehicle and the object in front and on the basis of the driving status of the vehicle and the object. As driving status, particular consideration is given to the speeds of the vehicle and the object and preferably also to the accelerations of the vehicle and the object. The times t1 and t2 are defined as time intervals in relation to the time t3.

In a first escalation stage E1, which is carried out at time t1, a visual and acoustic alarm is given as a warning indication. A haptic alarm is given in a second escalation stage E2 at time t2, and in a third escalation stage E3 at time t3 a full braking is effected as a braking process.

It is thus possible for the driver of the vehicle to resolve a critical traffic situation in a timely manner on his or her own by intervening. However, if the brake assist device 1 does not detect any appropriate driver reaction, at time t3 in the third escalation stage E3 it will automatically trigger a full braking in response to vehicles in front so that, at least under ideal conditions such as a dry road and no obstruction to visibility, a collision between the vehicle and the object in front of the vehicle is avoided. This only applies, however, if the object is traveling in the same direction as the vehicle, i.e., if the object was identified as a moving vehicle in front.

If the detected object is a stationary obstacle without any velocity of its own, however, only escalation stages E1 and E2 are triggered and the driver must therefore initiate a full braking on his or her own at time t3 in order to avoid a collision between the vehicle and the detected object. An automatic full braking is not triggered in response to stationary objects.

As mentioned previously, the trigger release conditions AS1 or AS2 based on the respective road type must be fulfilled in order for the assist function to be effected in the aforementioned escalation stages. These trigger release conditions are fulfilled if one or more of the following additional conditions are fulfilled.

A first additional condition requires that the curvature c of the road be less than or equal to a predetermined threshold value c_threshold according to:

$$c \leq c\_threshold. \quad [1]$$

For the highway-like road type, the threshold value c_threshold must be equal to a large curvature value c_large according to $$c\_threshold = c\_large \quad [2]$$

For the non-highway-like road type, according to $$c\_threshold=c\_small<c\_large, \quad [3]$$

the threshold value c_threshold must be equal to a small curvature value c_small, which is smaller than the large curvature value c_large.

A second additional condition requires that the object transverse offset y be less than or equal to a predetermined threshold value y_threshold according to:

$$y \leq y\_threshold, \quad [4]$$

wherein for the highway-like road type, the threshold value y_threshold must be equal to a large object transverse offset y_large according to $$y\_threshold=y\_large \quad [5]$$

For the non-highway-like road type, according to $$y\_threshold=y\_small<y\_large, \quad [6]$$

the threshold value y_threshold must be equal to a small object transverse offset y_small that is smaller than the large object transverse offset y_large.

A third additional condition requires that the change Δy in the object transverse offset y be less than or equal to a predetermined threshold value Δy_threshold according to:

$$\Delta y \leq \Delta y\_threshold, \quad [7]$$

wherein for the highway-like road type, the threshold value Δy_threshold must be equal to a large change Δy_large in the object transverse offset according to $$\Delta y\_threshold=\Delta y\_large \quad [8].$$

For the non-highway-like road type, according to $$\Delta y\_threshold=\Delta y\_small<\Delta y\_large, \quad [9]$$

the threshold value Δy_threshold must be equal to a small change Δy_small in the object transverse offset y that is smaller than the large change Δy_large in the object transverse offset y.

The trigger release condition AS1 for the highway-like road type and the trigger release condition AS2 for the non-highway-like road type can be generally summarized as follows:

$$AS1 = \begin{cases} c \leq c\_large \\ y \leq y\_large \\ \Delta y \leq \Delta y\_large \end{cases} \quad [10]$$

$$AS2 = \begin{cases} c \leq c\_small \\ y \leq y\_small \\ \Delta y \leq \Delta y\_small \end{cases} \quad [11]$$

wherein, in an advantageous manner, the trigger release condition AS2 for the non-highway-like road type must be continuously fulfilled for at least a predetermined time period.

In an advantageous manner, as a result, the brake assist device 1 is set to a "more sensitive" level on the highway-like road type than on the non-highway-like road type, such as on rural roads or within developed areas. The frequency of accidental interventions of the brake assist device 1 on the non-highway-like road type is thus reduced compared to a standard system design in which no differentiation between the different road types is carried out.

A specific exemplary embodiment of an effected assist function will be described in more detail in the following. For all calculations of the brake assist device 1 in terms of braking distance and collision avoidance, ideal road conditions (i.e., a friction coefficient of "1") shall be assumed. In particular a friction coefficient estimate shall not be performed.

By means of the brake assist device 1, the traffic situation in front of the vehicle is continuously monitored and analyzed, wherein data on the driver's vehicle are calculated and monitored, the distance A to moving vehicles or stationary objects in front are monitored and the speed thereof is detected.

Whether an object is relevant to the operation of the vehicle is determined by means of an algorithm for detecting relevant objects. Accordingly, a relevant object must be detected for longer than a second and a relative speed must be less than "0", meaning that the distance A between the driver's vehicle and the detected object is diminishing and the distance A must be greater than 0.25 m, i.e., the object must be located outside a dead zone of the radar sensor.

All conditions must therefore be fulfilled before a warning is actively emitted. The algorithm for calculating the time until the collision is determined by the friction coefficient of the road and a predetermined maximum deceleration of the vehicle, for example 6 m/s$^2$.

If, on the basis of the current driving situation, the brake assist device 1 senses a potential collision with a moving vehicle or stationary object in front, the driver action at time t0 is analyzed. This time t0 is, for example, 5.5 seconds before the time t3, the latest point in time at which a full braking with the predetermined maximum deceleration must be initiated in order to avoid a collision with the object. Preferably only vehicles traveling in front of and in the same lane as the driver's vehicle, or stationary objects directly in front of the driver's vehicle are accounted for. Oncoming vehicles are not taken into account.

If no driver action is detected, the driver is alerted, in particular after one second at time t1, visually by a warning indication on the instrument panel and acoustically by emission of an intermittent warning sound. The time t1 can also be 2 seconds to 2.5 seconds before the potential full braking.

After another second, wherein the time varies according to the estimated criticality of the situation, i.e., on the basis of an estimated collision probability, the brake assist device 1 will trigger a partial braking, i.e., a slight braking intervention compared to a full braking with a deceleration of, say, 3 m/s$^2$ at time t2 as a haptic alarm.

After still another second, the full braking is automatically triggered at time t3 if the detected object is a moving vehicle in front with a true speed of its own.

Until the initiation of the actual full braking or emergency braking at time t3, the automatic intervention can be terminated at any time by an appropriate reaction on the part of the driver, for example by actuating the turn signal, the brakes, gradual acceleration, a switching off and/or evasive maneuver with loss of the object for the detection unit 2. The driver can terminate a full braking automatically triggered by the brake assist device 1 by deactivating the system and/or by flooring the accelerator, which is also known as kickdown.

Preferably the escalation stages E1 to E3 and the trigger release conditions AS1, AS2 of the assist function are additional set and controlled on the basis of the environment parameters UP.

For the operation of the brake assist device 1, provision is made of a human-machine interface (not shown), which includes input elements via which the driver can program and/or control the functioning of the brake assist device 1 in such a way that the driver is able to make "his will" known, particularly in critical driving situations. The input elements include at least one pushbutton on the control panel, a gas pedal, a brake pedal, a turn indicator switch, and a steering wheel, wherein the curvature c on which the vehicle is being driven is calculated from the position of the steering wheel. The driver action is detected by means of the input elements. This driver action is taken into account by the brake assist device 1 when emitting the alarms.

The human-machine interface further includes all output elements via which the driver is informed and alerted. The alarm system is implemented and the driver is alerted to critical situations by means of the output elements.

The output elements include an output instrument INS, i.e. an output screen and a loud speaker, and the brake system BS illustrated in more detail in FIG. 4. By means of the output instrument INS, the visual alarm is displayed and the warning sound is emitted. The decelerations of the haptic alarm as partial braking and the full braking deceleration in full or emergency braking are generated by means of the brake system BS.

For providing warnings in a direct traffic environment of the vehicle, during full braking a so-called "emergency stop signal" can preferably be provided, which can be a visual signal generated by a vehicle lighting system and/or an acoustic signal generated by a vehicle horn.

The brake assist device 1 is activated by the driver with the pushbutton on the control panel. The driver is thus able to activate or deactivate the brake assist device 1 at any time. Preferably the visual alarm remains independently active even in the switched off state. When the vehicle ignition is turned on, the brake assist device 1 is activated in a standard mode in which a status indicator of the brake assist device 1 is deactivated. Preferably the status indicator is an LED arranged inside the pushbutton. The status is redundantly displayed by the LED in the pushbutton and as a text output in the display unit of the output instrument INS.

The brake assist device 1 furthermore implements two warning stages, which are activated on the basis of a remaining time reserve with regard to the impending collision. This ensures that the warning stages are implemented in a situation-based and dynamically controlled manner in the correct sequence that is always straightforward for the driver. The alarm system of the brake assist device 1 is thus designed such that a specific task is assigned to the driver at each warning stage. Along with the two main warning stages, a so-called ACC early warning (ACC=autonomous or adaptive cruise control) is taken into account.

With the ACC early warning, which is activated up to a control limit of 2 m/s$^2$, the visual alarm is generated. In addition a double warning sound is emitted as an acoustic alarm.

The first warning stage is activated in a critical situation. The visual alarm is emitted and in addition the double warning sound is emitted in a continuous sequence, resulting in an intermittent warning sound.

The second warning stage is activated in a very critical situation, in which the visual alarm and the intermittent warning sound remain activated. In addition, the haptic alarm is activated by the partial braking with a deceleration of 3 m/s$^2$, and the brake lights of the vehicle are activated as a warning to the traffic behind. The haptic alarm is additionally impinged relative to the current acceleration of the vehicle.

The last brake assist stage is the full braking in which the visual alarm remains activated during the triggered full braking. A continuous warning sound is emitted as well.

In a particularly advantageous embodiment, a radio and a hands-free telephone system are muted from the first warning stage on so that the driver is able to concentrate exclusively on the traffic in critical situations.

The alarm system of the brake assist device 1 is configured so that the driver can resolve a critical situation as soon as possible him/herself by braking or by evasion, without an automatic braking intervention. This ensures that the driver is able to maintain control of his/her vehicle at all times. For this reason the brake assist device 1 acknowledges all "relevant driver actions" such as actuation of the pushbutton, of the gas pedal, of the direction indicator, the steering action, and also the kickdown, which can be monitored by the driver according to the situation.

These driver actions are used to prevent the braking intervention in potential emergency braking situations if the driver shows a reaction to the acoustic and/or to the haptic alarm. In the last warning stage of full braking, the brake assist device 1 only analyzes the pushbutton along with the kickdown. All of the other inputs are no longer able to illicit the termination of the full or emergency braking because, for example, the driver may have inadvertently activated the turn signal due to the rapid deceleration of the vehicle.

In the event that driver action is detected, the acoustic alarm is automatically silenced. The visual alarm symbol continues to display, indicating that there is a potential hazard situation.

Once triggered, the driver can terminate or reverse the full braking at any time with the pushbutton or kickdown. The full or emergency braking is automatically deactivated again if the relative speed between the vehicle and the object is greater than "0" and the distance A is greater than 10 m before the vehicle comes to a standstill. If the vehicle is at a standstill, the full or emergency braking is automatically deactivated again if the true speed is "0".

In standstill, the vehicle is automatically held by the brake for at most an additional 5 seconds. The driver can then promptly remove the vehicle from the hazard zone or, by actuating a parking brake, prevent the vehicle from coasting. A text indication that a full or emergency braking has been carried out and ended is also emitted by the visual display.

In addition to the redundant measurement of the distance A with the aid of the radar signal runtime and the differential speed $V_{Diff}$ between the moving or stationary object in front of the vehicle and the vehicle itself, the plausibility of all input signals is determined with the aid of a frequency shift.

FIG. 3 shows the brake assist device 1 and other components coupled therewith, wherein the plausibility of the signals of said components as input signals is determined.

These components are the radar sensor RDF, a so-called radar front end. The radar sensor RDF supplies object data via a CAN bus of the vehicle to the control unit 3 of the brake assist device 1. To this end, use is made of two CAN messages that supply redundant information on detected targets. A first message is a standard message and a second message is a message with redundant data, which is validated via a so-called common power train controller CRC and a message counter (not shown). The object data contain information on the distance A, the relative speed (=differential speed $V_{Diff}$), a relative acceleration, the transverse offset y, and a measurement quality. The measurement quality contains information on an analog or digital capture, as well as a target density and other information.

Another component is a basic module GM, which superimposes the CAN messages of the radar sensor RDF from a so-called framework CAN and a modular switch panel MSF, which contains the pushbutton, and from a so-called interior CAN onto an IES-CAN. The data are thus copied, but not processed. In addition, the emergency stop signal can be triggered.

Another component is the brake system BS, which supplies the brake assist device 1 with information on a speed of a front axle and rear axle of the vehicle, the curve shape c, and the brake pedal position. The brake pedal position and the curve shape c are analyzed by the brake assist device 1 in order to detect driver action during the first warning stage.

The brake system BS receives the deceleration request from the brake assist device 1 via the CAN bus. Additionally, the braking intervention is validated by a checksum and the message counter and a "deceleration request bit".

Another component is the indicating instrument INS, which gives instructions for a warning sound, a distance alarm, text and error messages, and also controls a muting of the radio and the hands-free telephone system.

The modular switch panel MSF provides the brake assist device 1 with information on driver reactions in the form of pressing the pushbutton and actuating the left or right turn signal. The modular switch panel MSF receives the status of the LED in the pushbutton from the brake assist device 1 via the basic module GM.

The common power train controller CPC provides information on the speed and the brake pedal position, including an effected kickdown. The brake assist device 1 requires the brake pedal position and the information on the kickdown in order to detect driver action. From the common power train controller CPC, the brake assist device 1 requests an engine torque limitation and a deactivation of the cruise control via the CAN bus.

Additionally, the integrity of the hardware and software of the brake assist device 1 is checked in order to verify the plausibility of the input signals. Furthermore, a redundant calculation of all critical values and output variables such as a time reserve and a redundant reversing of the brake assist device 1 by the driver are possible at all times.

The objective is to prevent hazards to road traffic from arising due to simple errors, in accordance with the so-called fail-silent principle.

For monitoring the entire system function, the brake assist device 1 performs extensive checks of all input data. For example, the plausibility of the relative speed and the distance A over time are verified, in particular with regard to apparent objects. If unreal behavior is observed, an internal error is automatically triggered and the function is switched off. In doing so, three error classes are distinguished in a so-called error management. The first error class includes function-limiting errors, for instance if the brake system BS is offline. The second error class includes minor errors such as implausible calculations. The third error class includes permanent errors such as hardware errors.

Depending upon the type of error, the assist function is either shut off completely or else limited so that only a visual alarm is emitted.

Errors occurring in the functioning, communication, and hardware operation of the brake assist device 1 are processed on the basis of an existing diagnosis architecture. In the driving mode, only errors critical to the operation of the vehicle (such as the brake assist system 1 cannot be activated) are displayed for the driver.

Furthermore, with the vehicle at a standstill, the driver can use the display unit of the output instrument INS to query the entire error status of all control devices via so-called online process capability indexes. The error memory can also be queried offline in a repair shop with a diagnostic device or tester, for instance during an inspection or servicing of the vehicle.

System limits that are essentially defined by the system architecture of the brake assist device 1 are predetermined in order to ensure the safety of the vehicle passengers and of other traffic participants in the vicinity of the vehicle.

The haptic alarm in particular is limited to a braking intervention with a deceleration of 3 m/s$^2$.

Preferably the brake assist device 1 is automatically deactivated if the speed of the vehicle is less than 10 km/h, the parking brake is actuated, during an initialization and self-testing phase of the brake assist device 1, in the event of malfunctioning of an anti-lock system, and in the event of system errors in the brake assist device 1.

All system status and system errors are queried and checked by the vehicle diagnostics. Critical errors affecting safe operation of the vehicle are indicated by the display unit of the output instrument INS.

FIG. 4 shows an exemplary embodiment of an operational sequence of a method of the invention for operating a brake assist device 1 according to the description of FIGS. 1 through 3.

It is determined in a first process step S1 whether a detected lane width is greater than or equal to a predetermined lane width, wherein the predetermined lane width corresponds to a lane width of a highway-like road type and is preferably 3.60 m. It is furthermore determined in the first process step S1 whether exactly two marker lines are detected in the lane of the vehicle and whether a right marker line is wider than a left marker line, in particular wider than 20 cm. If these conditions are fulfilled, the road on which the vehicle is traveling is recognized as a highway-like road type and then a second process step S2 is effected. If these conditions are not fulfilled, the road on which the vehicle is traveling is recognized as a non-highway-like road type and then a third process step S3 is effected.

In the second process step S2, the trigger release condition AS1 for the highway-like road type is applied for deciding whether the assist function may be effected. If the trigger release condition AS1 is fulfilled, the assist function is in particular effected in such a way that the escalation stages E1 to E3 are effected in a first alarm cascade.

The first alarm cascade is effected only as long as the additional conditions are fulfilled, according to which the detected curvature c of the road is less than or equal to the large curvature value c_large according to $$c \leq c\_large \qquad [12]$$

and the object offset y of the detected relevant object is less than or equal to the large object transverse offset y_large according to $$y \leq y\_large \qquad [13]$$

and the change Δy of the object transverse offset y is less than or equal to the large change Δy_large of the object transverse offset y according to $$\Delta y \leq \Delta y\_large \qquad [14]$$

If one of the additional conditions is not fulfilled, the first alarm cascade is immediately cut off. If the additional conditions are fulfilled again, the first alarm cascade immediately resumes.

Carrying out the first alarm cascade results in a dependable triggering of the brake assist device 1, in particular with stationary objects, i.e., objects without a true speed of their own, on highway-like road types.

In the third process step S3, the trigger release condition AS2 for the non-highway-like road type is applied for deciding whether the assist function may be effected. The assist function is in particular effected in such a way that the escalation stages E1 to E2 are effected in a second alarm cascade such that more rigorous or more stringent filter conditions are applied for triggering the brake assist device 1, in particular for stationary objects without a true speed of their own.

The second alarm cascade is effected only if the following additional conditions are fulfilled for a predetermined time period.

According to the first additional condition, the detected curvature c of the road must be less than or equal to the small curvature value c_small according to $$c \leq c\_small \qquad [15]$$

According to the second additional condition, the object offset y of the detected relevant object must be less than or equal to the small object transverse offset c_large according to $$y \leq y\_small \qquad [16]$$

and according to the third additional condition, the change Δy in the object transverse offset y must be less than or equal to the small change Δy_large in the object transverse offset y according to $$\Delta y \leq \Delta y\_small \qquad [17]$$

If one of the additional conditions is not fulfilled, the second alarm cascade is immediately cut off. If the additional conditions are fulfilled again for at least the predetermined time period, the second alarm cascade immediately resumes.

According to the illustrated exemplary embodiment of the operational sequence of the method of the invention, different trigger release conditions AS1, AS2 are specified on the basis of the classification of the road on which the vehicle is being driven (i.e., on the basis of the detected road type) on the one hand, and for carrying out the assist function a distinction is made between stationary objects and moving objects in front of the vehicle on the other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a brake assist device for a vehicle, the method comprising:
classifying a road on which the vehicle is being driven;
determining an absence of a driver action; and
performing an assist function based on a distance of the vehicle from an object in front of the vehicle, the assist function including at least one of generating a warning indication and initiating an automatic braking process, wherein the assist function is only executed if at least one trigger release condition based on the classification is fulfilled;
wherein the classifying of the road involves a division into at least two classes of roads, including a first class as a highway-like road type and a second class as a non-highway-like road type;
wherein a first triggering release condition of the at least one triggering release condition is assigned to the first class and a second triggering release condition of the at least one triggering release condition is assigned to the second class, and the first triggering release condition sets a lower threshold for execution of the assist function for the highway-like road type than the second triggering condition for the non-highway-like road type;
wherein the assist function is performed in a plurality of escalation stages and includes at least the generation of a warning indication followed by the initiation of an automatic braking process; and
wherein a respective escalation stage (E1 to E3) of the assist function is selected or triggered on the basis of the classification of the road on which the vehicle is being driven.

2. The method as claimed in claim 1, wherein the classifying of the road into one of the first and second classes of roads is based on
a number or width of marker lines bordering a lane of the vehicle;
a width of the lane; or
map data of a digital road map.

3. The method as claimed in claim 1, further comprising:
validating the at least one trigger release condition by detecting at least one environment parameter of the vehicle is detected and comparing the detected at least one environment parameter with a threshold selected based on the classification of the road,
wherein the at least one environment parameters is a curvature of the road, a transverse offset of the object in front of the vehicle, or a change in the transverse offset.

4. The method as claimed in claim 1, wherein an optic or acoustic alarm is emitted as a warning indication in a first escalation stage, a partial braking is performed as a haptic alarm in a second escalation stage, and a full braking is performed as a braking process in a third escalation stage.

5. The method as claimed in claim 4, wherein the first and second escalation stages of the assist function are only carried out if the object in front of the vehicle is a stationary object or an object moving in a same direction as the vehicle, and the third escalation stage of the assist function is only carried out if the object in front of the vehicle is moving in the same direction as the vehicle.

6. A brake assist device for a vehicle, comprising:
a detection unit configured to detect a distance of the vehicle from an object in front of the vehicle;
a detection unit configured to detect driver actions of a driver of the vehicle;
a control unit configured to execute an assist function based on the detected distance and the detected driver actions, wherein the assist function includes at least generation of a warning indication or the initiation of an automatic braking process; and
an environment monitoring device configured to capture environment data relating to a road on which the vehicle is being driven,
wherein the control unit includes a processing unit coupled with the environment monitoring device, by means of which the road on which the vehicle is being driven can be classified with the aid of the captured environment data, and
wherein the control unit is configured to execute the assist function on the basis of the classification of the road on which the vehicle is being driven;
wherein the classifying of the road involves a division into at least two classes of roads, including a first class as a highway-like road type and a second class as a non-highway-like road type;
wherein a first triggering release condition of the at least one triggering release condition is assigned to the first class and a second triggering release condition of the at least one triggering release condition is assigned to the second class, and the first triggering release condition sets a lower threshold for execution of the assist function for the highway-like road type than the second triggering condition for the non-highway-like road type;

wherein the assist function is performed in a plurality of escalation stages and includes at least the generation of a warning indication followed by the initiation of an automatic braking process; and wherein a respective escalation stage (E1 to E3) of the assist function is selected or triggered on the basis of the classification of the road on which the vehicle is being driven.

* * * * *